United States Patent [19]

Giurati et al.

[11] Patent Number: 4,735,104

[45] Date of Patent: Apr. 5, 1988

[54] DRIVE TRANSMISSION UNIT FOR EQUAL FORWARD AND REVERSE SPEEDS, IN PARTICULAR FOR A SHIP DRIVE

[75] Inventors: Adriano Giurati; Vincenzo De Stefani, both of Padua, Italy

[73] Assignee: M.P.M. Meccanica Padana Monteverde S.p.A., Padua, Italy

[21] Appl. No.: 867,433

[22] Filed: May 28, 1986

[30] Foreign Application Priority Data

Jun. 12, 1985 [IT] Italy ............................... 41567 A/85

[51] Int. Cl.[4] .......................... F16H 1/14; F16H 1/20
[52] U.S. Cl. ........................................ 74/417; 74/361; 74/378; 74/379
[58] Field of Search ................ 74/417, 420, 322, 333, 74/361, 378, 379

[56] References Cited

U.S. PATENT DOCUMENTS

| 2,423,886 | 7/1947 | Hindmarch | 74/378 |
| 3,570,319 | 3/1971 | Arnold | 74/361 |
| 3,691,862 | 9/1972 | Halibrand | 74/379 |
| 3,803,934 | 4/1974 | Yokel | 74/361 |
| 4,188,833 | 2/1980 | Krauss et al. | 74/417 |

FOREIGN PATENT DOCUMENTS 2355125  6/1974  Fed. Rep. of Germany ........ 74/417

Primary Examiner—Dirk Wright
Attorney, Agent, or Firm—Guido Modiano; Albert Josif

[57] ABSTRACT

An input shaft is keyed to a first bevel gear, in constant mesh engagement with a second bevel gear keyed to a countershaft and rigidly associated with a first clutch, for causing a first pinion to become rotatively engaged with or disengaged from the input shaft. The second bevel gear is rigidly associated with a second clutch for causing a second pinion to become rotatively engaged with or disengaged from the countershaft. The first and the second pinions are in constant mesh engagement with an output bevel gear keyed to an output shaft, so that by selectively engaging one of the clutches and disengaging another of the clutches, the input and output shafts can be selectively caused to rotate counter-directionally or co-directionally. The axes of the shafts converge towards a common point to simplify the gear arrangements.

3 Claims, 3 Drawing Sheets

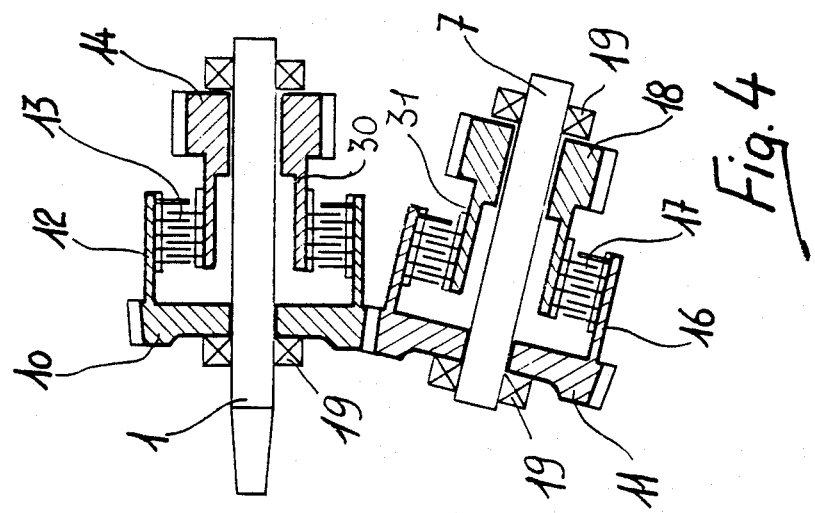
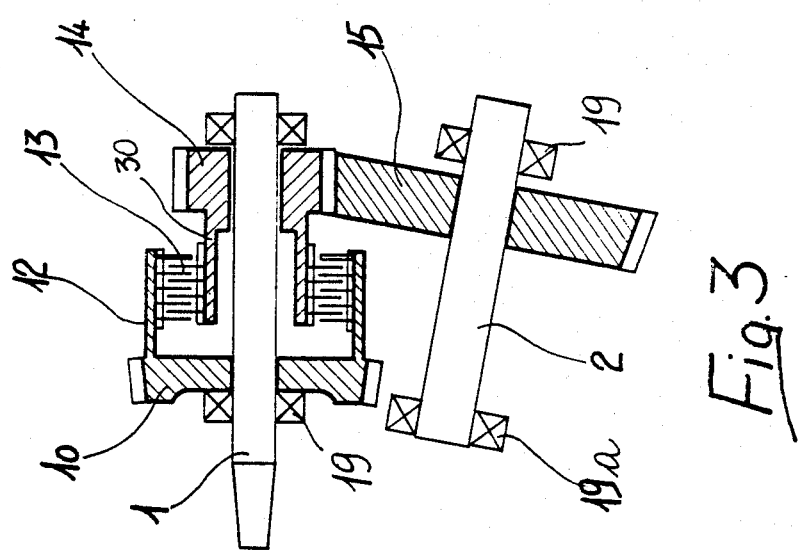

DRIVE TRANSMISSION UNIT FOR EQUAL FORWARD AND REVERSE SPEEDS, IN PARTICULAR FOR A SHIP DRIVE

BACKGROUND OF THE INVENTION

The present invention relates to a drive transmission unit.

In many applications motion transmission units are required wherein, first of all, the power output shaft is inclined with respect to the input shaft where the power is generated.

This is the case, for example, with marine applications, where the output shaft is conveniently horizontal whilst the output shaft or propeller shaft is inclined.

In addition, the direction of rotation of the output shaft must be selectively provided both in the same direction as and the opposite direction with respect to the direction of rotation of the input shaft because of the need to provide a reverse gear and for special applications.

In fact, in marine applications, it often occurs that the boat or craft is equipped with two engines which individually actuate one propeller each.

In this case to avoid problems of craft balancing, it is appropriate for the propellers in use to be counter-directionally rotating, thereby the transmission means which is interposed between the engine and the propeller that is the transmission drive, is for one propeller shaft arranged to turn in one direction and for the second propeller shaft to turn in the opposite direction.

In practice, in the situation of normal travel, one of the two drive transmissions is operable in a condition that is defined herein as "forward gear", whilst the other of the two drive transmissions is operable in a condition that is defined herein as "reverse gear".

With drive transmission units utilized heretofore, the performance and operating conditions respectively in "forward gear" and "reverse gear" are not the same owing indeed to the particular combination of gears that they contain.

This means that one transmission unit drive works in favourable conditions when in "forward gear" whilst its performance is notably inferior when it is operated in "reverse gear".

This depends on the fact that in one of the two directions of movement gears are employed which are different from those utilized in the other direction of movement.

SUMMARY OF THE INVENTION

It is an object of this invention to provide a drive transmission unit which enables motion to be transmitted from an input shaft to an output shaft, disposed at an angle relatively thereto, to effect both co-directional or counter-directional movement of the two shafts.

A consequent primary object is to provide a drive transmission unit whose operation in either of the two directions is equivalent with equal yields of the power transmitted.

A further object is to provide a compact drive transmission unit of reduced size which is capable of transferring considerable power.

Still another object is to provide a drive transmission unit, composed of series of gears which are identical for both the "forward gear" section and the "reverse gear" section thereof.

A not least object is to provide a drive transmission unit wherein the gears utilized are of a simple and inexpensive type.

These and other objects to become apparent hereinafter are achieved by a drive transmission unit, characterized in that it comprises at least three shafts, respectively an input shaft, an output shaft displaced angularly from the input shaft and a countershaft, the geometric axes of said input shaft and said output shaft lying on the same plane, said countershaft being provided adjacent said output and input shafts with its geometric axis disposed to intersect the point whereat the axes of said input and output shaft converge, to said first shaft there being keyed a first bevel gear in constant mesh with a second bevel gear keyed to said countershaft, said first and second bevel gears each having a clutch rigidly associated therewith whereby they are each coupled to an idler spur pinion on the respective axes, said two pinions both meshing in turn with a third bevel gear keyed to the output shaft, the two clutches being adapted, for being activated one alternatively to the other and for determining the direction of rotation of the output shaft.

BRIEF DESCRIPTION OF THE DRAWINGS

Further features and advantages of the invention will become apparent from the following detailed description of a preferred embodiment given herein, by way of example but not of limitation together with the accompanying illustrative, non-limitative drawings wherein:

FIG. 3 is a fragmentary sectional view of some of the drive transmission members which afford a first output direction of movement;

FIG. 4 is a fragmentary schematic sectional view of the combination of the members which determine a second output direction of movement;

DESCRIPTION OF THE PREFERRED EMBODIMENTS

Figure 1:
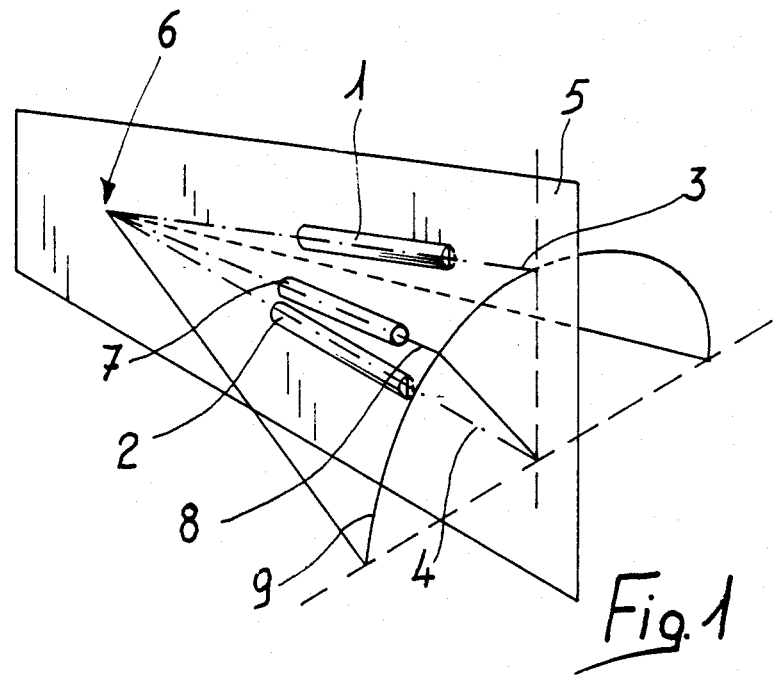
FIG. 1 shows schematically the geometric layout of the shafts which make up the drive transmission unit according to the invention.

With reference to the cited figures drive transmission unit comprises an input shaft 1 and an output shaft 2 the geometric axes whereof, 3 and 4 respectively, (FIG. 1) lie on the same plane 5 where they converge to a point 6.

A third shaft or countershaft indicated at 7 has its geometric axis 8 also convergent to and intersecting the common point 6 and laid along a generatrix line belonging to an ideal conical surface 9 wherein the axis of the cone is coincident with the axis 4 of the output shaft 2 and a generatrix line of the cone is the axis 3 of the input shaft 1.

Figure 2:
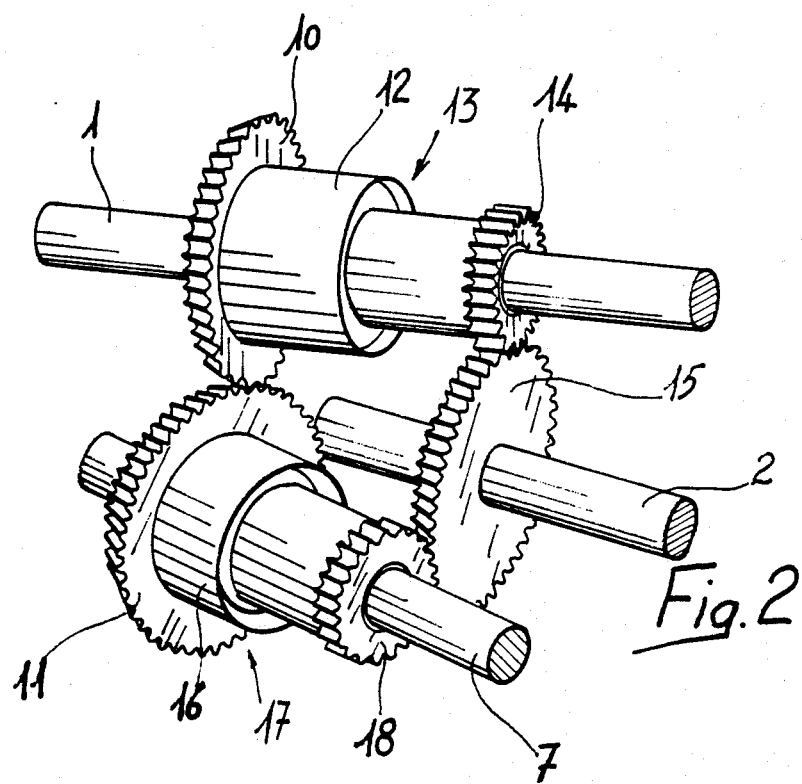
FIG. 2 is a schematic, perspective view of the layout of the shafts and the gears mounted thereon.

In FIG. 2 there is shown schematically the drive transmission such as it is fabricated.

To the input shaft 1 there is keyed a first bevel gear 10 which is in constant mesh engagement with a second identical bevel gear 11 keyed to the countershaft 7.

Said first bevel gear 10 is rigidly associated with the bell-housing 12 of a first clutch 13 which, being interposed between the bell-shaped housing 12 and a bush-like formation 30 rigidly connected to a first pinion 14 and extending coaxially to the bell-shaped housing 12, enables engagement and disengagement of the first pinion 14 mounted on the input shaft 1, so that the pinion 14 can be selectively adapted to be either idly rotatable on the input shaft 1 or rotatively rigidly associated therewith.

Said first pinion 14 meshes with an output bevel gear 15 keyed to the output shaft 2.

A second bevel gear 11 keyed to said countershaft 7 is rigidly associated with the bell 16 of a second clutch 17 which, being interposed between the bell-shaped housing 16 and a bush-like formation 31 rigidly connected to a second pinion 18 and extending coaxially to the bell-shaped housing 16, enables engagement or disengagement of the second pinion 18 mounted on the countershaft 7, so that the second pinion 18 can be selectively adapted to be either idly rotatable on the countershaft 7, or rotatively, rigidly associated therewith.

Said second pinion 18 is also in constant mesh engagement with said output bevel gear 15.

Each shaft is supported by suitable bearings 19 including, indicated at 19a, thrust bearings for the output shaft 2.

When the clutch 13 is engaged motion is transmitted from the input shaft 1 to the output shaft 2 through the first pinion 14 in mesh engagement with the output bevel gear 15 such that the rotation of the output shaft 2 occurs in the opposite direction with respect to the direction of rotation of the input shaft 1.

In this situation of course the second clutch 17 is disengaged and thus the second pinion 18 is permitted to rotate idly on the countershaft 7 as it is driven by the output bevel gear 15.

When the second clutch 17 is engaged and the first clutch 13 is disengaged motion is transmitted from the first bevel gear 10 keyed to the input shaft 1 to the second bevel gear 11 keyed to the countershaft 7 and hence from the countershaft 7, to the second pinion 18 rigidly associated therewith (by engagement of the clutch 17), and then from the second pinion 18 to the output bevel gear 15 and thus to the output shaft 2, with rotational movement of the output shaft 2 occuring in the same direction as the rotational movement of the input shaft 1, whilst the first pinion 14, driven by the output bevel gear 15, will rotate idly on the input shaft 1 by virtue of the disengagement of the first clutch 13.

In the drive unit illustrated the two gears 10 and 11 are alike bevel like gears whereas the two pinions 14 and 18 are identical spur gears.

With this invention there is afforded uniformity of operation in both directions since identical gear pairs are alternately engaged to provide the motion transfer.

This is particularly advantageous because one has the possibility of using pairs of drive transmission units in the presence of twin powerplants, with different output movement directions for the two units without this incurring recourse to having each unit perform differently or causing different wear rates over time.

Figure 5:
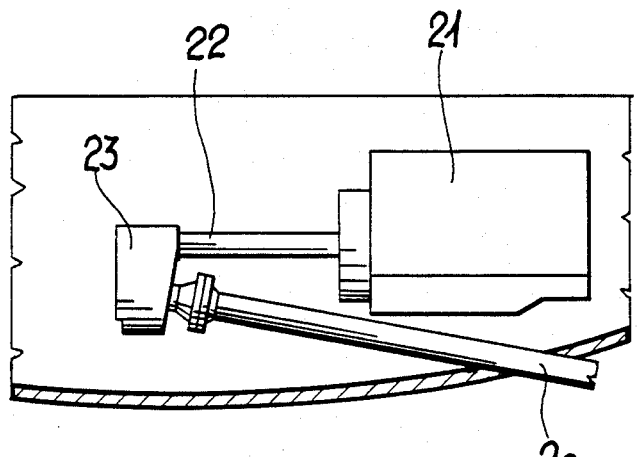
FIG. 5 is a schematic view illustrating a use of the drive transmission unit according to the invention in a "V-drive" situation.

The drive unit shown may be mounted in a V-drive scheme, as shown in FIG. 5 where the output axis now indicated at 20 is passed below the engine 21 disposed horizontally and connected to the input shaft 22 of the drive unit 23.

Figure 6:
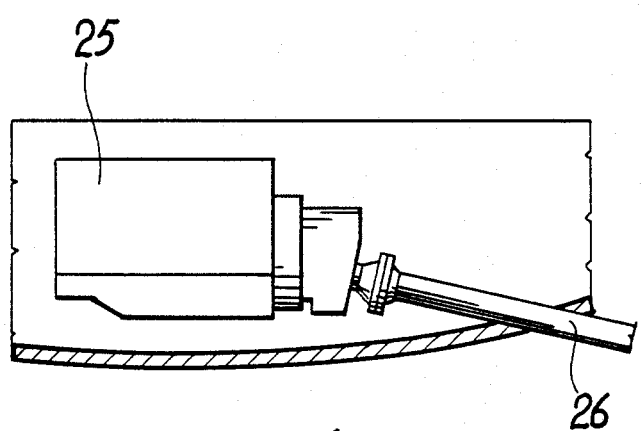
FIG. 6 schematically illustrates a further utilization of a drive according to the invention.

The same drive in FIG. 6 is mounted in a scheme herein called a Z-drive arrangement wherein the unit 24 connects the engine 25 disposed horizontally to the output shaft 26 inclined downwardly.

Additionally to the advantage of equal performance in both one and the other direction of operation, the unit shown, owing to its conformation, enables the use of spur pinions meshing with an output bevel wheel and of bevel gears in mutual mesh engagement relationship.

These combinations are capable of transferring considerable power while being of relatively reduced dimensions.

It thus becomes possible to fabricate a compact drive unit which particularly suits marine applications.

Also from the constructional standpoint bevel gears and spur pinions are easy to manufacture at a low cost.

A further factor of economy in manufacture derives from the fact that the unit advantageously comprises a pair of like bevel gears, a pair of like clutches, and a pair of like spur pinions with evident reduction of the different parts making up the drive.

It is apparent from the foregoing description and illustration that all the objects set forth have been achieved and in particular that a drive transmission unit has been provided which can operate in "forward gear" or "reverse gear" situations with characteristics of uniform performance and wear.

This enables considerable standardization both in production and use with evident advantages.

These features allow its use both in "V-drive" or "Z-drive" arrangements and in schemes where a twin powerplant is provided each having a drive of its own for driving the counter-rotating output shafts.

In this case it is of advantage that the two drives which turn obviously in opposite directions have anyhow the same behavior with equal performances and also equal durations over time which allows inter alia concurrent schemes of maintenance and servicing for the two units.

Of course what has been described and illustrated may be implemented materially in different ways without departing, however, from the protection scope of this invention.

Accordingly, the materials and dimensions may be selected as desired according to the contingent requirements.

We claim:

1. A drive transmission unit comprising:
   an input shaft defining an input shaft axis, said input shaft having an input bevel gear keyed thereon, an input spur pinion rotatable mounted thereon, and an input clutch interposed between said input bevel gear and said input spur pinion for controllably and rotatably coupling said input spur pinion to said input bevel gear.
   a countershaft defining a countershaft axis inclined to said input shaft axis, said countershaft having a countershaft bevel gear keyed thereon, a countershaft spur pinion rotatable mounted thereon and a countershaft clutch interposed between said countershaft bevel gear and said countershaft spur pinion for controllably and rotatably coupling said countershaft spur pinion to said countershaft bevel gear, said countershaft bevel gear being identical to and in constant mesh with said input bevel gear, said countershaft spur pinion being identical to said input spur pinion and said countershaft clutch being identical to said input clutch,
   an output shaft defining an output shaft axis inclined to said input shaft and countershaft axes, said output shaft having an output bevel gear keyed thereon and in constant mesh with said input and countershaft spur pinions, said input shaft, countershaft and output shaft axes converging toward a common point, and said input clutch and countershaft clutch being alternatively activated for determining the direction of rotation of said output shaft.

2. A drive tansmission unit comprising:
  an input shaft defining an input shaft axis, said input shaft having an input bevel gear keyed thereon, an input spur pinion rotatable mounted thereon, and an input clutch interposed between said input bevel gear and said input spur pinion for controllably and rotatably coupling said input spur pinion to said input bevel gear,
  a countershaft defining a countershaft axis inclined to said input shaft axis, said countershaft having a countershaft bevel gear keyed thereon, a countershaft spur pinion rotatable mounted thereon and a countershaft clutch interposed between said countershaft bevel gear and said countershaft spur pinion for controllably and rotatably coupling said countershaft spur pinion to said countershaft bevel gear, said countershaft bevel gear being identical to and in constant mesh with said input bevel gear, said countershaft spur pinion being identical to said input spur pinion and said countershaft clutch being identical to said input clutch,
  an output shaft defining an output shaft axis inclined to said input shaft and countershaft axes, said output shaft having an output bevel gear keyed thereon and in constant mesh with said input and countershaft spur pinions, said input shaft and countershaft axes being disposed to form generatrix lines of an ideal cone and said output shaft axis being arranged so as to define a central symmetry axis of said ideal cone, and said input clutch and countershaft clutch being alternatively activated for determining the direction of rotation of said output shaft.

3. A drive transmission unit comprising:
  an input shaft defining an input shaft axis,
  an input bevel gear keyed on said input shaft,
  an input spur pinion rotatable mounted on said input shaft,
  a first bell-shaped housing rigidly connected to said input bevel gear and coaxially surrounding said input shaft,
  a first bush-like formation rigidly connected to said input spur pinion and extending coaxially to said first bell-shaped housing and said input shaft,
  an input clutch accomodated between said first bell-shaped housing and said first bush-like formation for controllably and rotatably coupling said input spur pinion to said input bevel gear,
  a countershaft defining a countershaft axis inclined to said input shaft axis,
  a countershaft bevel gear keyed on said countershaft,
  a countershaft spur pinion rotatable mounted on said countershaft,
  a second bell-shaped housing rigidly connected to said countershaft bevel gear and coaxially surrounding said countershaft,
  a second bush-like formation rigidly connected to said countershaft spur pinion and extending coaxially to said second bell-shaped housing and said input shaft,
  a countershaft clutch accomodated between said second bell-shaped housing and said second bush-like formation for controllably and rotatably coupling said countershaft spur pinion to said countershaft bevel gear, said countershaft bevel gear being identical to and in constant mesh with said input bevel gear, said countershaft spur pinion being identical to said input spur pinon and said countershaft clutch being identical to said input clutch, an output shaft defining an output shaft axis inclined to said input shaft and countershaft axes,
  an output bevel gear keyed on said output shaft and being in constant mesh with said input and countershaft spur pinions, said input shaft and countershaft axes being disposed to form generatrix lines of an ideal cone and said output shaft axis being arranged so as to define a central symmetry axis of said ideal cone.

and said input clutch and countershaft clutch being alternatively activated for determining the direction of rotation of said output shaft.

* * * * *